(No Model.) 2 Sheets—Sheet 1.
E. WESTON.
ELECTRICAL MEASURING INSTRUMENT.
No. 480,898. Patented Aug. 16, 1892.
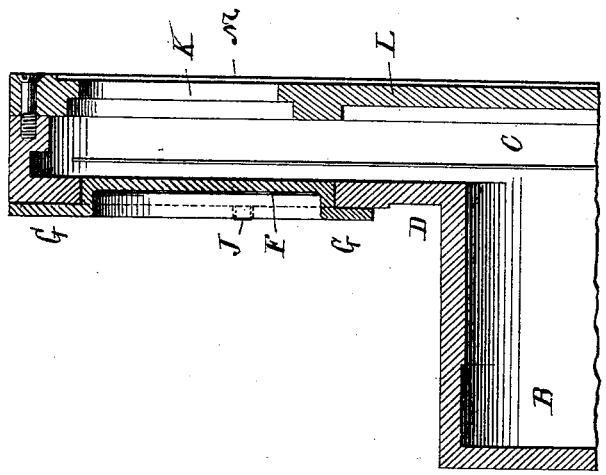
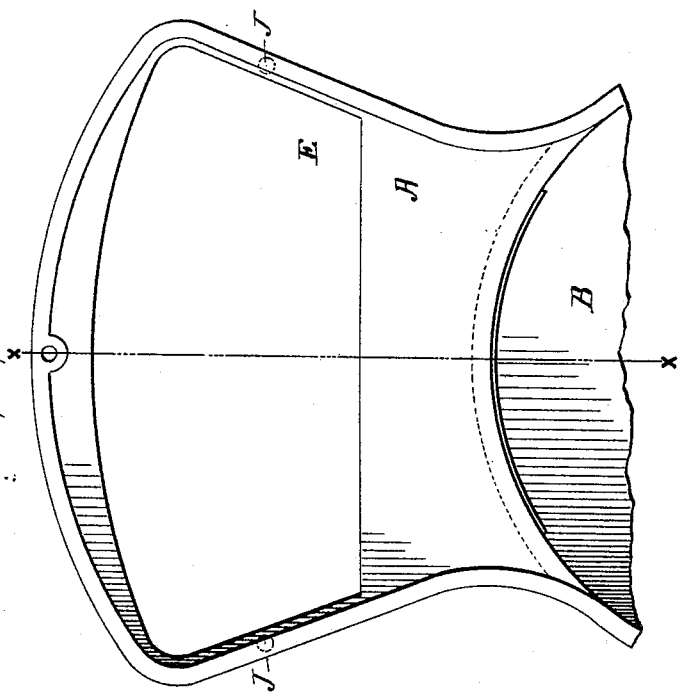
WITNESSES:
Gustave Dieterich.
H. R. Moller
INVENTOR
Edward Weston
BY
Park Benjamin
his ATTORNEY.
THE NORRIS PETERS CO., PHOTO-LITHO., WASHINGTON, D. C.

(No Model.)

E. WESTON.
ELECTRICAL MEASURING INSTRUMENT.

No. 480,898. Patented Aug. 16, 1892.

2 Sheets—Sheet 2.

WITNESSES:
Gustav Dieterich
H. R. Moller

INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 480,898, dated August 16, 1892.

Application filed February 17, 1892. Serial No. 421,900. (No model.)

*To all whom it may concern:*

Be it known that I, EDWARD WESTON, of Newark, Essex county, New Jersey, have invented a new and useful Improvement in Electrical Measuring-Instruments, of which the following is a specification.

In the construction of electrical measuring-instruments it is of great advantage to construct the scale so that it will be accessible or removable without disturbing the other parts of the apparatus. In calibrating an instrument and in laying out the scale it is often necessary to make corrections and changes in the latter, and it will readily be understood that if in order to do this the working parts of the instrument must be disarranged the relation of such parts becomes disturbed, and hence there is no certainty that this relation remains the same when the scale is replaced as it was before the scale was removed. The consequence is that accurate calibration is thus rendered exceedingly difficult. I have entirely overcome this difficulty by the simple expedient which constitutes my present invention—that is to say, a scale plate or support which is accessible in or removable from the instrument without causing the slightest disturbance of the working parts thereof.

Figure 3:
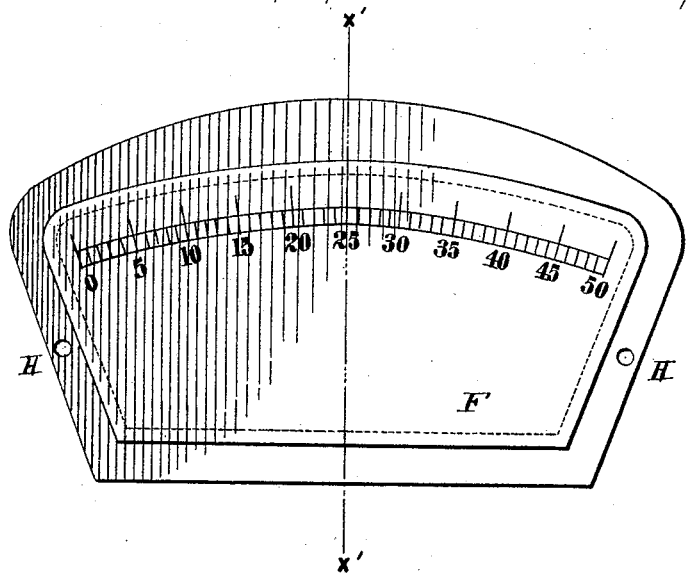
Figure 4:
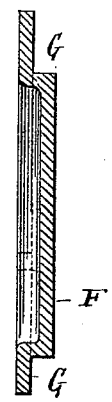
Figure 5:
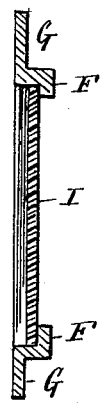

In the accompanying drawings, Figure 1 is a front elevation of an instrument-case to which my invention is here shown as adapted. Fig. 2 is a section on the line X X of Fig. 1. Fig. 3 shows the scale plate or support in front view separately. Fig. 4 is a section on the line X' X' of Fig. 3. Fig. 5 is a section similar to Fig. 4 and showing an inserted translucent scale-plate.

Similar letters of reference indicate like parts.

A represents the case of an electrical measuring-instrument. The working parts of this instrument for purposes of clearness are not here shown, but they may be considered as located in the lower part B of said case and that they operate to cause the vibration or movement of the needle C over the scale. (Shown in Fig. 2.) The nature of the works of the instrument is of course here immaterial; nor is it essential that there should be a needle, as C, because the index may be a spot of light reflected from a mirror and moving over the scale, or, in fact, any known mode or means of indicating some particular reading on the face of the scale. In the wall D of the instrument there is an opening E. This opening receives the scale plate or support F, which is provided with flanges G, which rest against the exterior of said wall. In the side of the flanges of the plate F at H are openings to receive the steady-pins J on the case. These pins J serve to insure the fact that the plate F when removed and replaced returns to exactly the same original position. Instead of putting the pins J on the case A and making the openings H in the plate F, I may of course put the pins on the plate F and cause them to enter openings in the case A, these constructions being obvious equivalents.

Upon the inner side of the plate F, I make a scale-marking, as shown in Fig. 3. This marking may be directly inscribed upon the plate or may be inscribed upon some other material fastened to the plate.

In practice I make the case A of metal and the plate F also of metal. Therefore I may enamel or whiten the inner surface of the plate F in any way, so as to make the scale-marking visible, or I may make a separate scale of paper, glass, or any other suitable substance and fasten it to the inner side of the scale-plate; or, as shown in Fig. 5, I may make the scale-plate F in the form of a rim or frame, which receives a separate scale-plate of glass I, secured therein in any suitable manner. Where it is desired to have a translucent scale-plate, I prefer the last-named construction; or, if desired, the entire plate F may be made of glass instead of metal, the kind of glass employed being white or opal glass roughened or ground on the inner side where the scale-marking is inscribed. When I use a glass scale-plate, the instrument is to be disposed so that some source of illumination is furnished behind the scale, which then becomes visible through the opening K in the front wall L of the case. The opening K is usually covered with a sheet of plain glass M.

It is to be understood that the shape of the case A is not at all material, inasmuch as it may be varied in any manner, so long as it has an opening adapted to receive a plate—such as F—in proper juxtaposition to the index, in which opening the said plate F may be inserted or from which it may be taken, as desired, without affecting the other parts of the instrument.

I claim—

1. In an electrical measuring-instrument, an inclosing case having a portion of one of its walls detachable and a scale upon said portion.

2. In an electrical measuring-instrument, an inclosing case having an opening in one of its walls, a plate constructed to fit in said opening, and a scale upon said plate.

3. In an electrical measuring-instrument, an inclosing case having an opening in one of its walls, a plate constructed to be received in said opening, a scale upon said plate, and guides whereby said plate may be adjusted in definite position in said opening.

4. In an electrical measuring-instrument, an inclosing case A, having an opening E in one of its walls, a flanged plate, as F, constructed to be received in said opening, and a scale upon said plate.

5. In an electrical measuring-instrument, an inclosing case A, having an opening E in one of its walls, a plate F, constructed to be received in said opening, a scale upon said plate, and fixed pins J on said wall entering apertures in said plate.

6. In an electrical measuring-instrument, an inclosing case having an opening in one of its walls, a flanged frame constructed to be received in said opening, and a plate of translucent material supported in said frame and inscribed with a scale-marking.

EDWARD WESTON.

Witnesses:
   H. R. MOLLER,
   M. BOSCH.